(12) United States Patent
Otsuka

(10) Patent No.: US 11,534,815 B2
(45) Date of Patent: Dec. 27, 2022

(54) PRESS FORMED PRODUCT, AUTOMOBILE STRUCTURAL MEMBER WITH THE PRESS FORMED PRODUCT, AND METHOD FOR PRODUCING PRESS FORMED PRODUCT

(71) Applicant: NIPPON STEEL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 166 days.

(21) Appl. No.: 16/498,238

(22) PCT Filed: Apr. 10, 2018

(86) PCT No.: PCT/JP2018/015002
§ 371 (c)(1),
(2) Date: Sep. 26, 2019

(87) PCT Pub. No.: WO2018/190320
PCT Pub. Date: Oct. 18, 2018

(65) Prior Publication Data
US 2020/0038934 A1    Feb. 6, 2020

(30) Foreign Application Priority Data

Apr. 10, 2017 (JP) .............................. JP2017-077433

(51) Int. Cl.
*B21D 22/26* (2006.01)
*B21D 24/00* (2006.01)
(Continued)

(52) U.S. Cl.
CPC ........... *B21D 22/26* (2013.01); *B21D 24/005* (2013.01); *B21D 37/08* (2013.01); *B62D 25/04* (2013.01); *B62D 25/06* (2013.01); *B62D 25/20* (2013.01)

(58) Field of Classification Search
CPC ...... B21D 24/00; B21D 24/005; B21D 22/20; B21D 22/26; B21D 37/08; B62D 25/04; B62D 25/06; B62D 25/20
See application file for complete search history.

(56) References Cited

U.S. PATENT DOCUMENTS 4,090,734 A    5/1978  Inami et al.
4,838,606 A *  6/1989  Furubayashi ......... B60J 5/0444
                                                          52/630

(Continued)

FOREIGN PATENT DOCUMENTS

JP    54-119121 U    8/1979
JP    56-39698 Y2    9/1981
(Continued)

OTHER PUBLICATIONS

International Search Report for PCT/JP2018/015002 dated Jun. 5, 2018.
(Continued)

*Primary Examiner* — Adam J Eiseman
*Assistant Examiner* — P Derek Pressley
(74) *Attorney, Agent, or Firm* — Birch, Stewart, Kolasch & Birch, LLP

(57) ABSTRACT

Disclosed is a press formed product which is formed from a single steel sheet. The press formed product includes two vertical wall portions, a top plate portion which connects two vertical wall portions with each other, and a projecting portion which projects from at least one boundary portion of two boundary portions each of which connects the vertical wall portion and the top plate portion with each other. In the projecting portion, a steel sheet extending from the vertical wall portion and a steel sheet extending from the top plate portion project from the boundary portion so as to overlap at an overlapping portion located at least at a distal end of the projecting portion. The projecting portion is present at least (Continued)

at a portion of the press formed product in a longitudinal direction. An angle formed between the top plate portion and the overlapping portion is larger than 180°.

5 Claims, 15 Drawing Sheets

(51) Int. Cl.
  *B21D 37/08*  (2006.01)
  *B62D 25/04*  (2006.01)
  *B62D 25/06*  (2006.01)
  *B62D 25/20*  (2006.01)

(56) References Cited

U.S. PATENT DOCUMENTS

| | | | | |
|---|---|---|---|---|
| 8,516,874 | B2 * | 8/2013 | Moore | B21D 19/086 |
| | | | | 72/313 |
| 2004/0000184 | A1 * | 1/2004 | Jung | B21D 37/08 |
| | | | | 72/452.9 |
| 2004/0250585 | A1 * | 12/2004 | Bennett | B21D 45/02 |
| | | | | 72/60 |
| 2015/0007911 | A1 * | 1/2015 | Murakami | C22C 38/32 |
| | | | | 148/507 |
| 2015/0367392 | A1 * | 12/2015 | Nishimura | B21D 22/20 |
| | | | | 72/379.2 |

FOREIGN PATENT DOCUMENTS

| | | | |
|---|---|---|---|
| JP | 58-209615 | A | 12/1983 |
| JP | 58209615 | A * | 12/1983 |
| JP | 9-249155 | A | 9/1997 |
| JP | 2008-155749 | A | 7/2008 |
| JP | 2008-265609 | A | 11/2008 |
| JP | 2010-242168 | A | 10/2010 |
| JP | 2011-67841 | A | 4/2011 |
| JP | 2011-83807 | A | 4/2011 |
| JP | 2012-121377 | A | 6/2012 |
| JP | 2013-27894 | A | 2/2013 |
| WO | WO 2005/102784 | A2 | 11/2005 |

OTHER PUBLICATIONS

Written Opinion of the International Searching Authority for PCT/JP2018/015002 (PCT/ISA/237) dated Jun. 5, 2018.

* cited by examiner

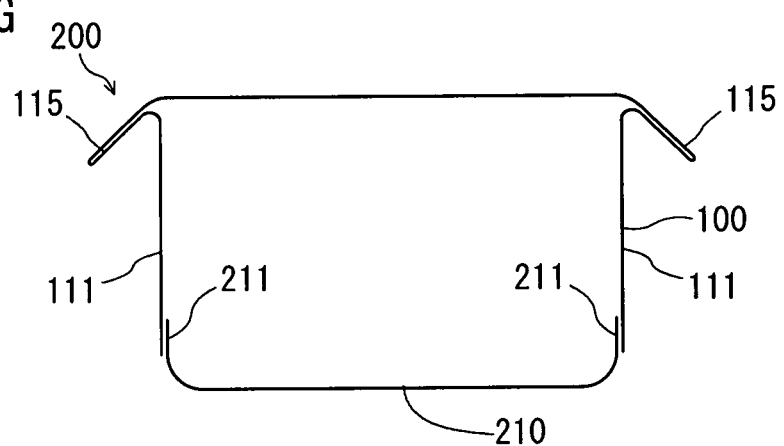
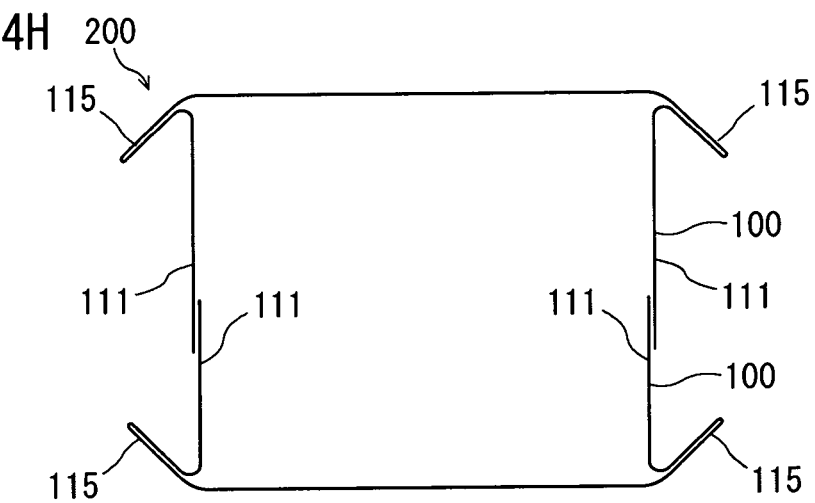

Sample 1 (Comparative Example)

Sample 2 (Reference Example 1)

Sample 3 (Reference Example 2)

PRESS FORMED PRODUCT, AUTOMOBILE STRUCTURAL MEMBER WITH THE PRESS FORMED PRODUCT, AND METHOD FOR PRODUCING PRESS FORMED PRODUCT

TECHNICAL FIELD

The present invention relates to a press formed product, an automobile structural member with the press formed product, and a method for producing the press formed product.

BACKGROUND ART

In order to increase collision safety, an automobile structural member (in particular, continuous length member) is required to have high characteristics in a three-point bending test. Accordingly, there have been a variety of proposals conventionally.

Drawings of Patent Literature 1 (Japanese Patent Application Publication No. 2008-265609) and Patent Literature 2 (Japanese Patent Application Publication No. 2008-155749) disclose an impact absorbing member which includes a portion where a steel sheet is folded over into three layers.

Patent Literature 3 (Japanese Patent Application Publication No. 2010-242168) discloses a method for forming a recessed portion on a wall portion of a member having a substantially hat shape in cross section. In this method, the wall portion is pressed by a power supply roller, thus forming the recessed portion. Accordingly, a portion which projects from the wall portion is not formed with this method before the recessed portion is formed.

Patent Literature 4 (Japanese Patent Application Publication No. 2011-67841), Patent Literature 5 (Japanese Patent Application Publication No. 2011-83807), and Patent Literature 6 (Japanese Patent Application Publication No. 2013-27894) state that although an application of a high tensile strength material has been contemplated in order to improve safety of an automobile, the high tensile strength material has a problem in terms of workability (paragraph [0002] of each Literature). Accordingly, as an example of a component having high collision safety even without using a high tensile strength material, Patent Literatures 4 and 5 take a component having a hat shape in cross section which has a large number of ridge lines in cross section (paragraph [0003] of Patent Literatures 4 and 5). Further, as an example of a component having high collision safety even without using a high tensile strength material, Patent Literatures 4 to 6 take a component where recessed portions (bead portions) are formed along the longitudinal direction (paragraph [0003] of Patent Literatures 4 and 5, and paragraph [0004] of Patent Literature 6).

Patent Literature 4 discloses, as a component having high safety even without using a high tensile strength material, a component having a hollow columnar shape where connection regions between vertical wall portions and a top wall portion bulge outward. In order to increase the number of ridge lines in cross section, the bulged portion is not folded.

Patent Literature 5 discloses, as a method for producing a component having high safety even without using a high tensile strength material, a method for producing a component having a hat shape in cross section where groove-shaped bead portions are formed on vertical wall portions along the longitudinal direction.

Patent Literature 6 discloses, as a component having high safety even without using a high tensile strength material, a frame component which includes reinforcing portions each of which is formed at a connection portion between a top wall portion and a vertical wall portion. This reinforcing portion is formed of an overlapping portion rolled into a cylindrical shape ([0015] of Patent Literature 6).

CITATION LIST

Patent Literature

Patent Literature 1: Japanese Patent Application Publication No. 2008-265609
Patent Literature 2: Japanese Patent Application Publication No. 2008-155749
Patent Literature 3: Japanese Patent Application Publication No. 2010-242168
Patent Literature 4: Japanese Patent Application Publication No. 2011-67841
Patent Literature 5: Japanese Patent Application Publication No. 2011-83807
Patent Literature 6: Japanese Patent Application Publication No. 2013-27894

SUMMARY OF INVENTION

Technical Problem

Currently, there is a demand for a structural member which can increase collision safety. In other words, there is a demand for a press formed product having higher characteristics in a three-point bending test. Under such circumstances, it is one of the objectives of the present invention to provide a press formed product having higher characteristics in a three-point bending test, an automobile structural member with the press formed product, and a method for producing the press formed product.

Solution to Problem

A press formed product according to one embodiment of the present invention is a press formed product formed from a single steel sheet. This press formed product includes two vertical wall portions, a top plate portion which connects the two vertical wall portions with each other, and at least one projecting portion which projects from at least one boundary portion of two boundary portions each of which connects the vertical wall portion and the top plate portion with each other. In the projecting portion, the steel sheet extending from the vertical wall portion and the steel sheet extending from the top plate portion project from the boundary portion so as to overlap at an overlapping portion located at least at a distal end of the projecting portion. The projecting portion is present at least at a portion of the press formed product in a longitudinal direction. An angle formed between the top plate portion and the overlapping portion is larger than 180°.

A structural member according to one embodiment of the present invention is an automobile structural member which includes the press formed product of this embodiment, and another member. Another member is fixed to the press formed product such that the press formed product and another member form a closed cross section.

A production method according to one embodiment of the present invention is a method for producing the press formed product of this embodiment. This production method includes: a first step of forming a preformed product including two first portions to be formed into the two vertical wall portions and a second portion to be formed into the top plate portion by deforming a blank steel sheet; and a second step of forming the press formed product by performing press forming on the preformed product. The preformed product includes a surplus portion for forming the projecting portion. In the second step, at least portions of the blank steel sheet constituting the surplus portion are made to overlap with each other, thus forming the overlapping portion.

Advantageous Effects of Invention

According to the present invention, it is possible to acquire a press formed product having higher characteristics in a three-point bending test, and an automobile structural member with the press formed product. Further, according to the production method of this embodiment, the press formed product can be easily produced.

BRIEF DESCRIPTION OF DRAWINGS

FIG. 4G is a cross-sectional view schematically showing another example of the structural member of this embodiment.

FIG. 4H is a cross-sectional view schematically showing another example of the structural member of this embodiment.

DESCRIPTION OF EMBODIMENTS

Figure 1:
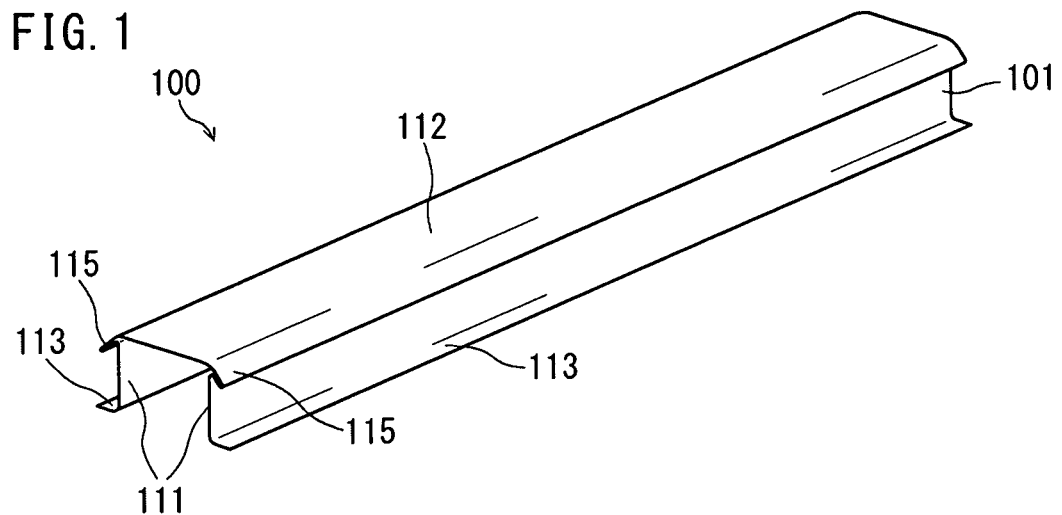
FIG. 1 is a perspective view schematically showing one example of a press formed product of this embodiment.

Inventors of the present invention have made extensive studies and, as a result, have newly found that a specific structure can improve characteristics with respect to collision. The present invention is based on this new finding.

Hereinafter, embodiments of the present invention are described. In the description made hereinafter, the embodiments of the present invention are described by giving examples. However, the present invention is not limited to the examples described hereinafter. In the description made hereinafter, there may be the case where a specific numerical value or a specific material is exemplified. However, another numerical value or another material may be used provided that the advantageous effects of the present invention can be acquired.

(Press Formed Product)

A press formed product of this embodiment is a press formed product formed from a single steel sheet. Hereinafter, this press formed product may be referred to as "press formed product (P)". The press formed product (P) includes two vertical wall portions, a top plate portion which connects the two vertical wall portions with each other, and at least one projecting portion which projects from at least one boundary portion of two boundary portions each of which connects the vertical wall portion and the top plate portion with each other. In the projecting portion, the steel sheet extending from the vertical wall portion (the steel sheet which is contiguous from the vertical wall portion) and the steel sheet extending from the top plate portion (the steel sheet which is contiguous from the top plate portion) project from the boundary portion so as to overlap at an overlapping portion located at least at the distal end of the projecting portion. The projecting portion is present at least at a portion of the press formed product (P) in the longitudinal direction. An angle formed between the top plate portion and the overlapping portion is larger than 180°. The angle formed between the top plate portion and the overlapping portion may be referred to as "angle X" hereinafter. The angle X is described in detail in a first embodiment. There may be the case where minute unevenness or the like is formed on the top plate portion so that a portion of the top plate portion does not have a flat plate shape. In such a case, an angle acquired by assuming the entire top plate portion as a flat plate is assumed as the angle of the top plate portion.

The press formed product (P) of this embodiment may include two flange portions which extend from edge portions of the two vertical wall portions (edge portions on a side opposite to the top plate portion), respectively.

At least at the distal end portion of the projecting portion, the steel sheet extending from the top plate portion and the steel sheet extending from the vertical wall portion are made to overlap with each other, thus forming two layers. In this specification, a portion of the projecting portion where the steel sheets are made to overlap with each other so as to form two layers may be referred to as "overlapping portion". The steel sheet is bent at the distal end portion of the projecting portion.

The press formed product (P) of this embodiment can be formed by deforming a single steel sheet (blank steel sheet). Specifically, the press formed product (P) of this embodiment can be produced by performing press forming on a single blank steel sheet by a production method of this embodiment. The blank steel sheet which is used as a material is described later.

The press formed product (P) of this embodiment has a long and thin shape as a whole. All of the vertical wall portions, the top plate portion, the flange portions, and the projecting portions extend along the longitudinal direction of the press formed product (P). The projecting portion may be formed over the entire press formed product (P) in the longitudinal direction, or may be formed only at a portion of the press formed product (P) in the longitudinal direction.

Hereinafter, a region surrounded by the two vertical wall portions, an imaginary surface which connects the edge portions of the two vertical wall portions with each other, and the top plate portion may be referred to as "the inside of the press formed product (P)". Further, a region on a side opposite to the inside with respect to the vertical wall portions and the top plate portion may be referred to as "the outside of the press formed product (P)".

The top plate portion connects the two vertical wall portions with each other. To be more specific, the top plate portion connects the two vertical wall portions with each other via projecting portions. In another aspect, the top plate portion is a lateral wall portion which connects the two vertical wall portions with each other. Accordingly, in this specification, the top plate portion may be alternatively referred to as a lateral wall portion. In the case where the press formed product (P) is disposed with the lateral wall portion (top plate portion) facing downward, the lateral wall portion may be also referred to as bottom plate portion. In this specification, however, the case where the lateral wall portion is disposed on the upper side is used as a reference so that the lateral wall portion is referred to as top plate portion.

Each angle Y formed between the top plate portion and the vertical wall portion is usually 90° or an angle around 90°. The angle Y is described in the first embodiment. The angle Y may be less than 90°. However, the angle Y is usually 90° or more, and may fall within a range from 90° to 150°. Two angles Y may differ from each other. However, it is preferable that the two angles Y be substantially equal to each other (the difference between the two angles Y be equal to or less than 10°). The two angles Y may be equal to each other.

It is preferable that the press formed product (P) of this embodiment include two projecting portions which respectively project from the two boundary portions. In this case, one projecting portion projects from each of the two boundary portions. It is preferable that the angles X at the two projecting portions be substantially equal to each other (the difference between the angles X be equal to or less than 10°). The angles X at the two projecting portions may be equal to each other. It is preferable that the two projecting portions be formed so as to have shapes which are line-symmetrical with each other in cross section perpendicular to the longitudinal direction. However, the two projecting portions may not be formed so as to be line-symmetrical with each other.

The angle X formed between the top plate portion and the overlapping portion may be larger than 180° and 270° or less.

In the press formed product (P) of this embodiment, the length of the projecting portion in cross section perpendicular to the longitudinal direction may be 3 mm or more (5 mm or more, 10 mm or more, or 15 mm or more, for example). The upper limit of the length is not particularly limited. However, the length may be 25 mm or less, for example.

In the press formed product (P) of this embodiment, the steel sheet extending from the vertical wall portion and the steel sheet extending from the top plate portion may be welded to each other at the projecting portion. For example, the steel sheets which are formed into two layers at the overlapping portion may be welded by spot welding or laser welding. Further, the steel sheet extending from the vertical wall portion and the steel sheet extending from the top plate portion may be joined with each other by arc welding (fillet welding) at the root portions of the projecting portion (a boundary between the top plate portion and the projecting portion, and a boundary between the vertical wall portion and the projecting portion). The lengths of the two projecting portions may or may not be equal to each other.

In the press formed product (P) of this embodiment, the tensile strength of the steel sheet which forms the press formed product may be 340 MPa or more (for example, 490 MPa or more, 590 MPa or more, 780 MPa or more, 980 MPa or more, or 1200 MPa or more). In the case where a second step in the production method described later is performed by hot stamping, the tensile strength of a press formed product can be made higher than the tensile strength of the steel sheet (blank) which is used as a material.

The press formed product (P) of this embodiment can be used for various applications. For example, the press formed product (P) of this embodiment can be used for a structural member of various transportation means (an automobile, a motorcycle, a railway vehicle, a ship, an aircraft) or for a structural member of various machines. An example of an automobile structural member may be a side sill, a pillar (a front pillar, a front pillar lower, a center pillar or the like), a roof rail, a roof arch, a bumper beam, a belt line reinforcement, and a door impact beam. The automobile structural member may be a structural member other than the above-mentioned structural members.

(Automobile Structural Member)

The press formed product (P) of this embodiment may be directly used as any of various structural members. That is, an automobile structural member of this embodiment includes the press formed product (P) of this embodiment. The automobile structural member of this embodiment may be referred to as "structural member (S)" hereinafter. The structural member described hereinafter can be used as a structural member for a product other than an automobile.

The structural member (S) of this embodiment may include the press formed product (P) and another member. Another member may be referred to as "another member (M)" or "member (M)" hereinafter. Another member (M) may be fixed to the press formed product (P) such that the press formed product (P) and another member (M) form a closed cross section. In the case where the press formed product (P) includes the above-mentioned two flange portions, another member (M) may be fixed to the two flange portions such that the press formed product (P) and another member (M) form a closed cross section.

The member (M) is a member (steel sheet member) formed from a steel sheet, for example. A steel sheet of the same kind as a steel sheet for forming the press formed product (P) may be used as a steel sheet for forming the member (M). One example of the member (M) is the press formed product (P) of this embodiment. In this case, two press formed products (P) are fixed to each other.

A method for fixing the press formed product (P) and another member (M) with each other is not limited. The press formed product (P) and another member (M) may be fixed with each other by welding, or by another fixing method. Examples of the welding include the above-mentioned examples.

(Method for Producing Press Formed Product (P))

A production method of this embodiment is a method for producing the press formed product (P) of this embodiment. The description of the press formed product (P) of this embodiment is applicable to the production method of this embodiment and hence, a repeated description may be omitted. Further, the description of the production method of this embodiment is applicable to the press formed product (P) of this embodiment.

The production method of this embodiment includes a first step and a second step. In the first step, a preformed product, which includes two first portions to be formed into two vertical wall portions and a second portion to be formed into the top plate portion, is formed by deforming a blank steel sheet. In the second step, the preformed product is subjected to press forming, thus forming a press formed product (P).

The preformed product includes surplus portions for forming the projecting portions. In the second step, at least portions of a blank steel sheet (deformed blank steel sheet) constituting the surplus portion are made to overlap with each other, thus forming an overlapping portion. Typically, in the preformed product, there is no clear boundary between the surplus portion and the remaining portions. However, there may be a boundary between the surplus portion and the remaining portions.

The preformed product may include a U-shaped portion having a U shape in cross section perpendicular to the longitudinal direction. This U-shaped portion forms the two vertical wall portions, the top plate portion, and the projecting portion. In the description made hereinafter, the term "cross section" means a cross section in a direction perpendicular to the longitudinal direction in principle.

The first step is not particularly limited, and may be performed by known press forming. The second step is described later. A press formed product acquired from the second step may be further subjected to post processing. The press formed product acquired from the second step (or acquired from post processing performed thereafter) may be directly used, or may be used in combination with another member.

Hereinafter, a steel sheet (blank steel sheet) which is a starting material may be referred to as "blank". The blank is usually a steel sheet having a flat plate shape, and has a plane shape which corresponds to the shape of the press formed product (P) to be produced. The thickness and physical properties of the blank are selected according to characteristics which the press formed product (P) is required to possess. For example, in the case where a press formed product (P) is an automobile structural member, a blank which is suitable for the automobile structural member is selected. The thickness of the blank may fall within a range from 0.4 mm to 4.0 mm, or a range from 0.8 mm to 2.0 mm, for example. The wall thickness of the press formed product (P) of this embodiment is determined by the thickness of the blank and processing steps, and may fall within a range of the thickness of the blank exemplified in this paragraph.

It is preferable that the blank be formed of a high tensile strength steel sheet (high tensile strength material) having tensile strength of 340 MPa or more (for example, 490 MPa or more, 590 MPa or more, 780 MPa or more, 980 MPa or more, or 1200 MPa or more). To reduce the weight of a structural member, it is preferable that the blank have high tensile strength. It is more preferable that the blank have tensile strength of 590 MPa or more (980 MPa or more, or 1180 MPa or more, for example). There is no upper limit of the tensile strength of a blank. In one example, the tensile strength of a blank is 2000 MPa or less. The tensile strength of the press formed product (P) of this embodiment is usually equal to or higher than the tensile strength of the blank. The tensile strength of the press formed product (P) of this embodiment may fall within a range exemplified in this paragraph.

In the case where the tensile strength of a blank steel sheet (blank) is 590 MPa or more, the second step may be performed by hot stamping (hot pressing). In the case where a blank has high tensile strength, cold pressing easily causes cracks at the distal end portion of a projecting portion. Accordingly, in the case of using a blank having tensile strength of 590 MPa or more (780 MPa or more, for example), it is preferable to perform the second step by hot stamping. It is needless to say that the second step may be performed by hot stamping even in the case of using a blank having tensile strength of less than 590 MPa. In the case of performing hot stamping, a blank may be used which has a known composition suitable for hot stamping.

In the case where a blank has tensile strength of 590 MPa or more and a wall thickness of 1.4 mm or more, it is particularly preferable to perform the second step by hot stamping in order to suppress the occurrence of cracks at the projecting portion. For the similar reason, in the case where a blank has tensile strength of 780 MPa or more and a wall thickness of 0.8 mm or more, it is particularly preferable to perform the second step by hot stamping. Heated steel sheet has high ductility. Accordingly, in the case of performing the second step by hot stamping, there is a low occurrence of cracks even if the wall thickness of a blank is 3.2 mm.

None of Patent Literatures 4, 5, nor 6 discloses a production method which uses hot stamping. However, as described above, it is preferable to perform the second step by hot stamping in the case of using a high tensile strength material.

Usually, the amount of deformation in the first step is not especially large. Accordingly, usually, the first step can be performed by cold working (cold pressing, for example) regardless of tensile strength of a blank. However, the first step may be performed by hot working (hot pressing, for example) when necessary. In a preferred example, the first step is performed by cold working, and the second step is performed by hot stamping.

One example of hot stamping is described hereinafter. In the case of performing hot stamping, first, a workpiece (a blank or a preformed product) is heated to a predetermined quenching temperature. The quenching temperature is a temperature higher than the A3 transformation point (more specifically, the Ac3 transformation point) at which the workpiece is austenitized. The quenching temperature may be 910° C. or above, for example. Next, the heated workpiece is pressed by a pressing device. The workpiece is heated already and hence, cracks do not easily occur even if the workpiece is significantly deformed. The workpiece is rapidly cooled in pressing the workpiece. With such rapid cooling, the workpiece is quenched at the time of pressing. The workpiece can be rapidly cooled by cooling a press tooling, or by injecting water to the workpiece from the press tooling. The procedure (heating and pressing and the like) of the hot stamping and a device used for the hot stamping is not particularly limited. A known procedure and a known device may be used.

The second step may be performed using a press die including a lower die, an upper die, and slide dies which are movable in the horizontal direction toward the lower die. In this case, the second step may include the following step (i) and step (ii). The step (i) is a step where the two first portions (portions to be formed into vertical wall portions) are constrained by the lower die and the slide die. The step (ii) is a step where, in a state where the two first portions are constrained, the second portion (a portion to be formed into a top plate portion) is pressed by the lower die and the upper die, and the surplus portions are pressed by the upper die and the slide dies, thus forming a press formed product.

The lower die may include a lower die body, and a pad connected to the lower die body via an extension and contraction mechanism. In this case, the production method of this embodiment may include a step (iii) and a step (iv). The step (iii) is a step where, after the step (ii), constraint (constraint of the vertical wall portions) by the lower die and the slide dies is released, and the upper die and the pad are moved upward, thus moving the press formed product upward. The step (iv) is a step where, after the step (iii), the slide dies are separated from the lower die.

In the case where the press formed product (P) includes two flange portions which extend from edge portions of the two vertical wall portions, the production method of this embodiment may include a third step of forming the flange portions after the second step. One example of a method for forming the flange portions is described in a third embodiment.

Hereinafter, embodiments of the present invention are described with reference to drawings. The embodiments described hereinafter merely form examples, and the above-mentioned various variations are applicable. In the description made hereinafter, the identical reference symbols are given to the similar components, and repeated description may be omitted. Further, to facilitate the understanding, in the following drawings, there may be the case where a gap is illustrated between steel sheets which are made to overlap with each other at the overlapping portion. However, usually, one steel sheet and another steel sheet which are made to overlap with each other at the overlapping portion are brought into close contact with each other.

First Embodiment

Figure 2:
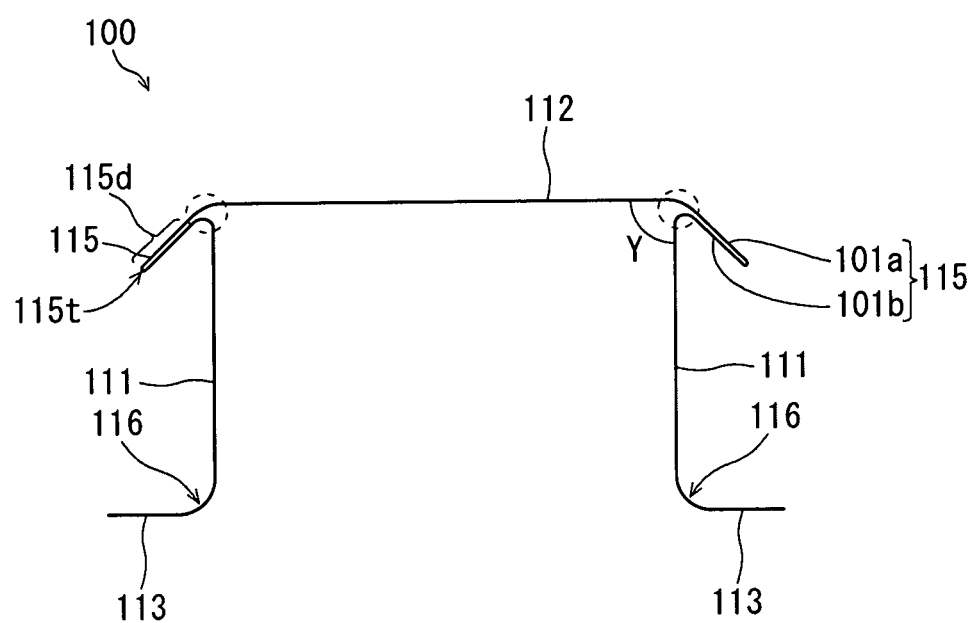
FIG. 2 is a cross-sectional view schematically showing the press formed product shown in FIG. 1.
Figure 3A:
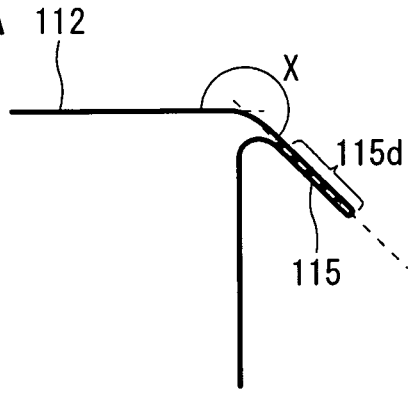
FIG. 3A is a partially enlarged view of the cross section shown in FIG. 2.
Figure 3B:
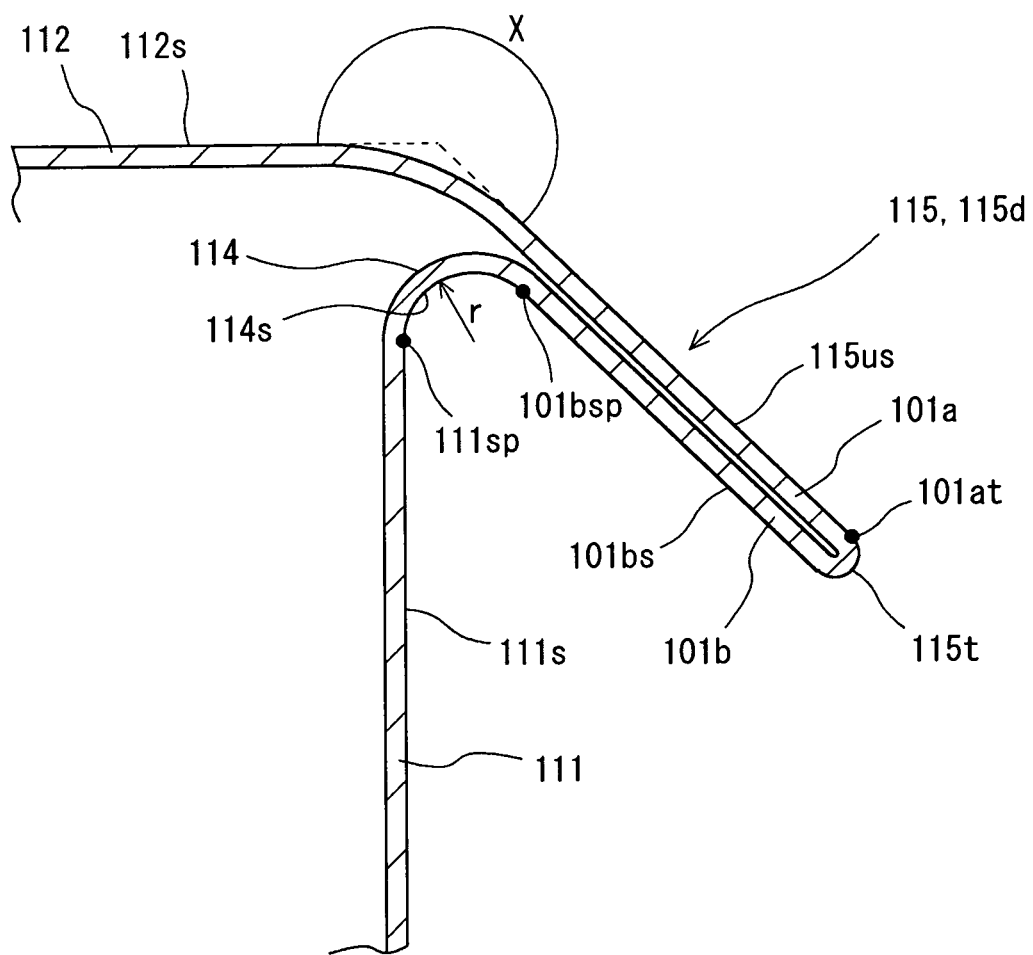
FIG. 3B is an enlarged view of FIG. 3A.

In a first embodiment, an example of a press formed product (P) of this embodiment is described. FIG. 1 is a perspective view schematically showing a press formed product 100 of the first embodiment. FIG. 2 is a cross-sectional view schematically showing the cross section perpendicular to the longitudinal direction of the press formed product 100. Further, FIG. 3A and FIG. 3B are cross-sectional views schematically showing a projecting portion 115 and an area around the projecting portion 115. Hereinafter, the upper side in FIG. 2 (top plate portion 112 side) may be referred to as the upper side of the press formed product (P) 100 of this embodiment. The lower side in FIG. 2 (flange portion 113 side) may be referred to as the lower side of the press formed product (P) of this embodiment.

The press formed product 100 is formed from a single steel sheet 101. Referring to FIG. 1 and FIG. 2, the press formed product 100 includes two vertical wall portions 111, top plate portion 112, two flange portions 113, and two projecting portions 115. Each of the vertical wall portion 111, the top plate portion 112, and the flange portion 113 has a flat plate shape. The top plate portion 112 connects the two vertical wall portions 111 with each other via the two projecting portions 115. In one example shown in FIG. 2, the two flange portions 113 extend substantially horizontally toward the outside from lower edge portions of the two vertical wall portions 111. That is, the flange portions 113 are substantially parallel to the top plate portion 112.

Referring to FIG. 2 and FIG. 3B, each projecting portion 115 projects outward from a boundary portion which connects the vertical wall portion 111 and the top plate portion 112 with each other (see portions indicated by dotted lines in FIG. 2). In this embodiment, a portion which is bent toward the projecting portion 115 from the upper edge side of the vertical wall portion 111 is assumed as a corner portion 114. That is, the corner portion 114 is formed of a portion ranging from a position where the vertical wall portion 111 starts to bend toward the projecting portion 115 to the upper edge portion of an overlapping portion 115d of the projecting portion 115.

Each projecting portion 115 is formed of a steel sheet 101a extending from the top plate portion 112, and a steel sheet 101b extending from the vertical wall portion 111. A portion extending outward from a bent portion at the edge portion of the top plate portion 112 is assumed as the steel sheet 101a. A portion extending from the vertical wall portion 111 and which is bent at the corner portion 114 so as to extend outward is assumed as the steel sheet 101b. The steel sheet 101a is bent at a distal end portion 115t of the projecting portion 115, and is connected to the steel sheet 101b. The surface of the steel sheet 101a on the lower side and the surface of the steel sheet 101b on the upper side are made to overlap and are brought into close contact with each other within a range from the corner portion 114 to the projecting portion 115. Each of the steel sheet 101a and the steel sheet 101b forms a portion of the steel sheet 101. The press formed product 100 excluding the projecting portions 115 has a substantially hat shape in cross section (cross section perpendicular to the longitudinal direction).

As shown in FIG. 3A and FIG. 3B, an angle formed between the top plate portion 112 and the overlapping portion 115d in cross section is assumed as an angle X. To be more specific, the angle X is an angle formed between a surface 112s of the top plate portion 112 on the upper side of the surfaces of the top plate portion 112 and a surface 115us of the overlapping portion 115d on the upper side of the surfaces of the overlapping portion 115d. In this embodiment, in the case where the overlapping portion 115d of the projecting portion 115 includes a straight line shape in cross section (see FIG. 8C, FIG. 8D and FIG. 8E, for example), an angle formed between the surface 115us of the straight line portion of the overlapping portion 115d and the surface 112s of the top plate portion 112 is assumed as the angle X. In the case where the cross sectional shape of the overlapping portion 115d does not include a straight line shape as shown in FIG. 8F, of the surface of the steel sheet 101a on the upper side, the edge portion of the overlapping portion 115d on the distal end portion 115t side is assumed as an edge 101at. An angle formed between an imaginary tangential line (a dotted line extending in the vertical direction in FIG. 8F) at the edge 101at and the surface 112s of the top plate portion 112 is assumed as the angle X.

In the case where the angle X is larger than 90°, when the press formed product 100 is viewed from above the top plate portion 112, the steel sheet 101b which forms the projecting portion 115 cannot be observed due to the steel sheet 101a. Such a portion may be referred to as negative angle portion. In another aspect, the negative angle portion is a portion which has an inverse gradient when press forming is performed only by an upper die and a lower die.

It is preferable that the angle X formed between the top plate portion 112 and the overlapping portion 115d is larger than 180° and 270° or less. When the angle X falls within such a range, there is no possibility that the overlapping portion 115d of the projecting portion 115 (the steel sheet 101b on the inner side) is brought into close contact with the vertical wall portion 111 and hence, a clearance is ensured between the projecting portion 115 and the vertical wall portion 111. With such a configuration, when a collision load is applied to the top plate portion 112, stress applied to the top plate portion 112 is dispersed at the corner portions 114 and the projecting portions 115 so that the stress is applied to the vertical wall portions 111 while the shapes of the corner portions 114 are maintained. Accordingly, the stress is received by the entire vertical wall portions 111, thus improving collision characteristics. Further, it is possible to prevent that the corner portion 114 is locally deformed, or the vertical wall portion 111 is inclined outward using the corner portion 114 as a fulcrum. Accordingly, even in the case where the vertical wall portion 111 is deformed, the vertical wall portion 111 is deformed so as to be inclined inward.

On the other hand, in the case where the overlapping portion 115d of each projecting portion 115 is brought into close contact with the vertical wall portion 111, when a collision load is applied to the top plate portion 112, stress of the collision load is applied to the portion of each vertical wall portion 111 which is brought into close contact with the overlapping portion 115d via the overlapping portion 115d in a concentrated manner. Accordingly, the vertical wall portion 111 is deformed so as to be locally inclined inward from the portion of the vertical wall portion 111 which is brought into close contact with the overlapping portion 115d. In this case, collision characteristics are reduced.

FIG. 2 shows one example of the case where an angle Y formed between the vertical wall portion 111 and the top plate portion 112 is 90°. In this embodiment, the angle Y is an angle shown in FIG. 2, that is, an angle formed between the vertical wall portion 111 and the top plate portion 112 on the inside of the press formed product 100.

As shown in FIG. 2, it is preferable that a corner portion 116 which connects the vertical wall portion 111 and the flange portion 113 have a round shape in cross section. Causing the corner portion 116 to have a round shape can suppress occurrence of buckling at the corner portion 116.

As shown in FIG. 2 and FIG. 3B, it is preferable that the corner portion 114 (corresponding to "Ra" in FIG. 8B) at the boundary between the steel sheet 101b forming the projecting portion 115 and the vertical wall portion 111 have a curved surface. Causing the corner portion 114 to have a curved surface allows stress applied to the top plate portion 112 from above to be dispersed at the corner portion 114 and hence, it is possible to suppress buckling of the corner portion 114. In the cross section perpendicular to the longitudinal direction of the press formed product 100, the radius of curvature r of the corner portion 114 may fall within a range from 3 to 15 mm (range from 3 to 10 mm, for example). However, the radius of curvature r is shorter than the length of the projecting portion 115 in cross section.

In another aspect, the lower limit of the radius of curvature r of the corner portion 114 may be half of the sheet thickness of the steel sheet 101, or 1 mm, whichever is greater. The upper limit of the radius of curvature r of the corner portion 114 may be a value ten times greater than the sheet thickness. When a radius of curvature r is excessively small, stress is not sufficiently dispersed at the corner portion 114 so that the vertical wall portion 111 may be broken off using the corner portion 114 as a starting point at the time of collision. Further, the excessively small radius of curvature r causes the overlapping portion 115d of the projecting portion 115 to be brought into close contact with the vertical wall portion 111. Accordingly, stress at the time of collision is concentrated at the portion where the overlapping portion 115d is brought into close contact with the vertical wall portion 111 and hence, the vertical wall portion 111 may be broken off. On the other hand, when the radius of curvature r is excessively large, stress applied to the top plate portion 111 does not easily transferred to the projecting portion 115 via the corner portion 114 and hence, an advantageous effect of improving collision characteristics obtained by providing the projecting portions 115 is reduced. In order to improve collision characteristics, it is desirable that a clearance between the projecting portion 115 and the vertical wall portion 111 has a value of at least half or the sheet thickness or 1 mm, whichever is greater.

To be more specific, the radius of curvature r of the corner portion 114 means, the radius of curvature of an outer surface 114s of the corner portion 114 in cross section perpendicular to the longitudinal direction of the press formed product 100. The outer surface 114s of the corner portion 114 is a surface which is positioned between an upper edge 111sp of an outer surface 111s of the vertical wall portion 111 and an upper edge 101bsp of a surface 101bs of the steel sheet 101b forming the projecting portion 115.

Second Embodiment

In a second embodiment, the description is made with respect to examples of structural members (S) each of which uses a press formed product (P) of this embodiment. The examples of the structural members (S) are shown in FIG. 4A to FIG. 4H. FIGS. 4A, 4B, 4E to 4H are views each of which schematically shows a cross section perpendicular to the longitudinal direction of the structural member (S). FIG. 4C and FIG. 4D are perspective views each of which schematically shows the structural member (S). Each of all structural members (S) shown in FIG. 4A to FIG. 4H has a closed cross section.

Figure 4A:
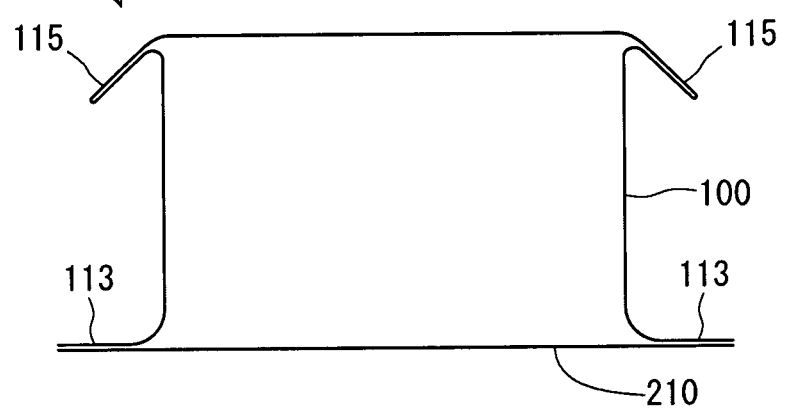
FIG. 4A is a cross-sectional view schematically showing one example of a structural member of this embodiment.

A structural member 200 shown in FIG. 4A includes a press formed product 100 which includes projecting portions 115, and a member 210 (another member (M)) having a flat plate shape. The member 210 is fixed to two flange portions 113 of the press formed product 100 such that the press formed product 100 and the member 210 form a closed cross section.

Figure 4B:
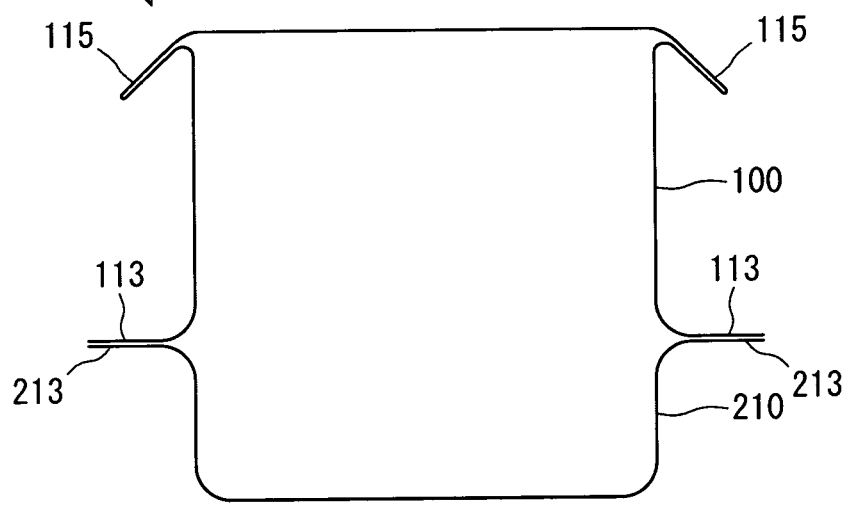
FIG. 4B is a cross-sectional view schematically showing another example of the structural member of this embodiment.
Figure 4C:
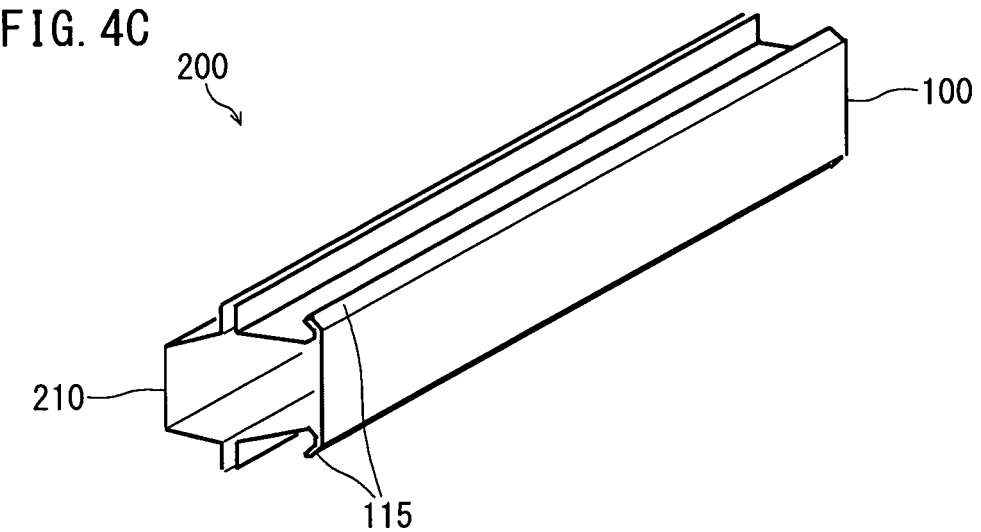
FIG. 4C is a perspective view schematically showing one example of a structural member having the cross section shown in FIG. 4B.
Figure 4D:
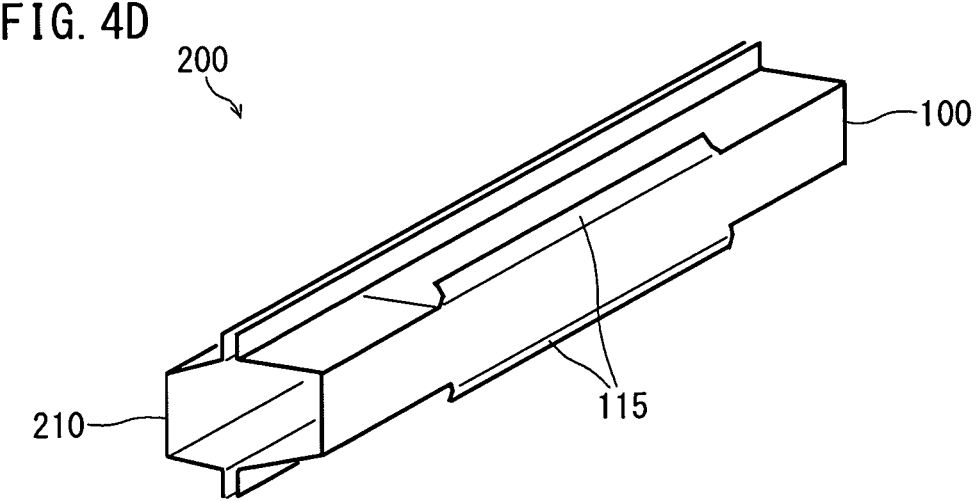
FIG. 4D is a perspective view schematically showing another example of the structural member having the cross section shown in FIG. 4B.

A structural member 200 shown in FIG. 4B includes a press formed product 100 which includes projecting portions 115, and another member 210. The member 210 is a member having a substantially hat shape in cross section, and includes two flange portions 213. The two flange portions 113 of the press formed product 100 are fixed to the two flange portions 213 of the member 210 such that the inside of the press formed product 100 and the inside of the member 210 oppose to each other.

FIG. 4C is a perspective view showing one example of a structural member having the cross section shown in FIG. 4B, and FIG. 4D is a perspective view showing another example. In the structural member 200 shown in FIG. 4C, the projecting portions 115 are formed over the entire structural member 200 in the longitudinal direction. In the structural member 200 shown in FIG. 4D, the projecting portions 115 are only partially formed on the structural member 200 in the longitudinal direction.

Figure 4E:
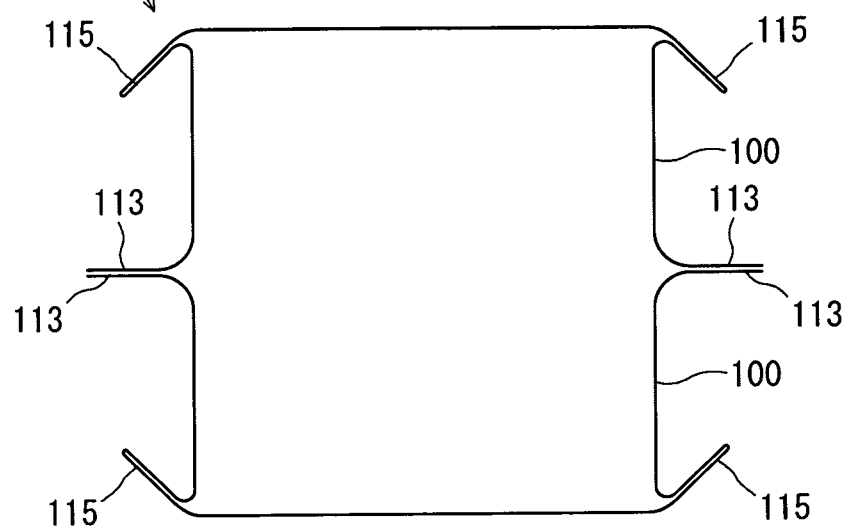
FIG. 4E is a cross-sectional view schematically showing another example of the structural member of this embodiment.

A structural member 200 shown in FIG. 4E includes two press formed products 100 each of which includes projecting portions 115. Flange portions 113 are fixed with each other such that the inside of one press formed product 100 and the inside of another press formed product 100 oppose to each other. Either one of the two press formed products 100 may be assumed as another member (M).

Figure 4F:
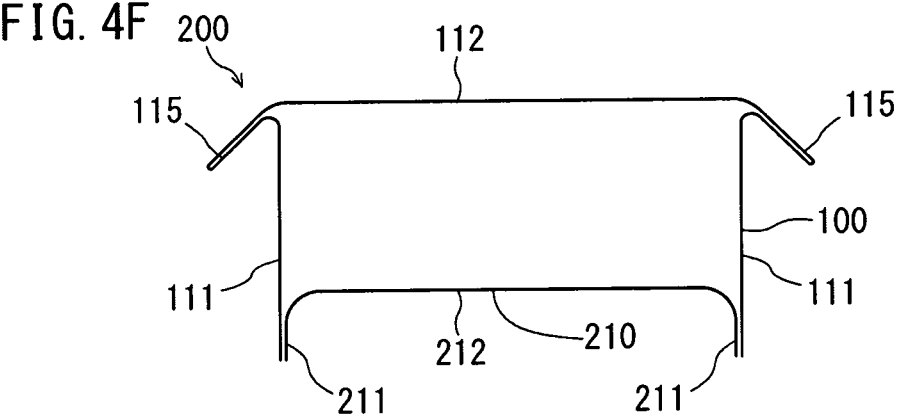
FIG. 4F is a cross-sectional view schematically showing another example of the structural member of this embodiment.

A structural member 200 shown in FIG. 4F includes a press formed product 100 which includes projecting portions 115, and a member 210. The press formed product 100 includes two vertical wall portions 111 and a top plate portion 112 which connects the two vertical wall portions 111 with each other. The member 210 includes two vertical wall portions 211 and a top plate portion 212 which connects the two vertical wall portions 211 with each other. In the structural member 200 shown in FIG. 4F, neither of the press formed product 100 nor the member 210 includes a flange portion. In one example shown in FIG. 4F, the vertical wall portions 111 of the press formed product 100 and the vertical wall portions 211 of the member 210 are fixed with each other such that the top plate portions have the same direction with respect to the vertical wall portions.

A structural member 200 shown in FIG. 4G differs from the structural member 200 shown in FIG. 4F only with respect to the direction of fixing the member 210. In one example shown in FIG. 4G, vertical wall portions 111 of a press formed product 100 and vertical wall portions 211 of a member 210 are fixed with each other such that the inside of the press formed product 100 and the inside of the member 210 oppose to each other.

A structural member 200 shown in FIG. 4H includes two press formed products 100 each of which includes projecting portions 115. Neither of the two press formed products 100 includes a flange portion. Vertical wall portions 111 of one press formed product 100 and vertical wall portions 111 of another press formed product 100 are fixed with each other such that the inside of the one press formed product 100 and the inside of another press formed product 100 oppose to each other.

Third Embodiment

In a third embodiment, a method for producing the press formed product (P) according to the present invention is described. According to this production method, a preformed product is formed in a first step, and the preformed product is pressed in a second step. With such steps, the press formed product (P) 100 of this embodiment can be produced. In the third embodiment, one example where the second step is performed by hot stamping is described.

Figure 5:
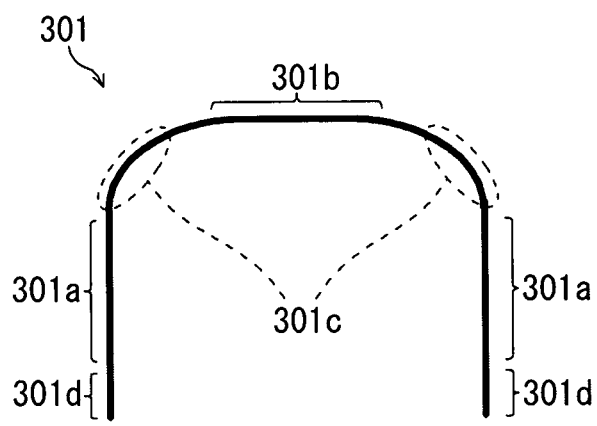
FIG. 5 is a cross-sectional view schematically showing one example of a preformed product formed by a production method of this embodiment.

First, in the first step, a blank steel sheet is deformed so as to form a preformed product 301 which includes two portions (first portions) to be formed into two vertical wall portions 111, and a portion (second portion) to be formed into a top plate portion 112. The first step can be performed by the above-mentioned method (by pressing, for example). FIG. 5 schematically shows a cross section (cross section perpendicular to the longitudinal direction) of one example of the preformed product 301 formed in the first step.

The preformed product 301 has a substantially U shape in cross section (inverted in FIG. 5). The preformed product 301 includes two first portions 301a to be formed into the two vertical wall portions 111, and a second portion 301b to be formed into the top plate portion 112. The preformed product 301 further includes portions (surplus portions 301c) to be formed into projecting portions 115. FIG. 5 shows the case where the preformed product 301 includes third portions 301d to be formed into flange portions 113. In the case of producing a press formed product (P) having no flange portion, a preformed product 301 includes no third portion 301d.

The second step is performed by hot stamping. First, the preformed product 301 is heated to a temperature of the Ac3 transformation point or above (a temperature greater than the Ac3 transformation point by 80° C. or greater, for example). This heating is performed by heating the preformed product 301 in a heater, for example.

Figure 6A:
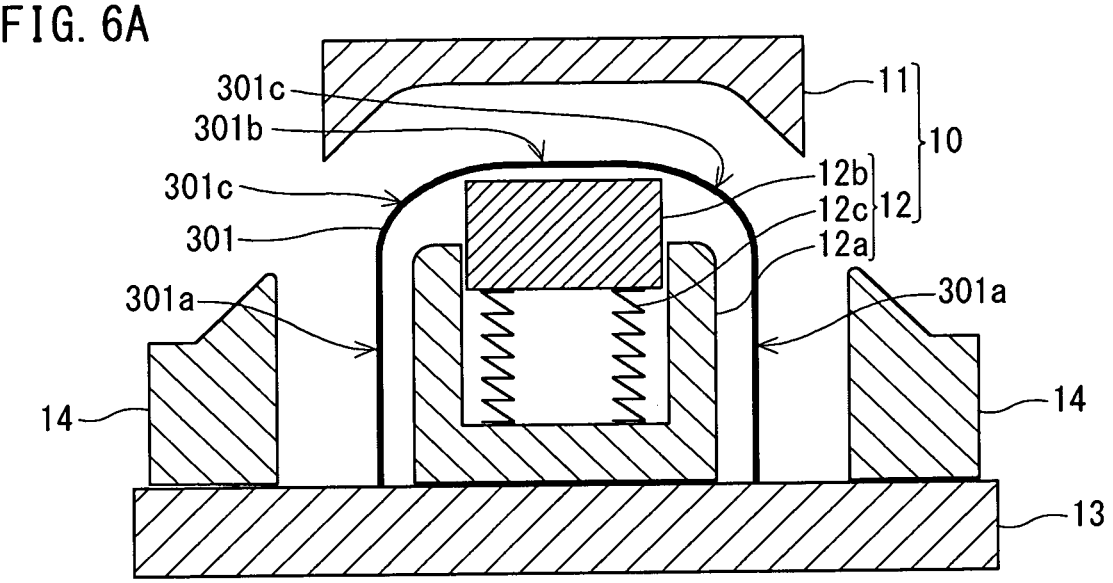
FIG. 6A is a cross-sectional view schematically showing one step in a second step in one example of a production method of this embodiment.

Next, the heated preformed product 301 is pressed by a pressing device. One example of the configuration of a press die used for pressing is shown in FIG. 6A. The pressing device includes a pair of press dies 10, a plate 13, and two slide dies 14.

The pair of press dies 10 includes an upper die 11 (die) and a lower die 12 (punch). The lower die 12 includes a lower die body 12a and a pad 12b. The pad 12b is connected to the lower die body 12a via an extension and contraction mechanism 12c which can be extended and contracted. A known extension and contraction mechanism, such as a spring or a hydraulic cylinder, may be used as the extension and contraction mechanism.

The slide dies 14 slide on the plate 13 in the horizontal direction. The slide dies 14 may be caused to slide using a cam mechanism which moves with the movement of the press die 10. Alternatively, the slide dies 10 may be caused to slide using an actuator, such as a hydraulic cylinder.

Figure 6B:
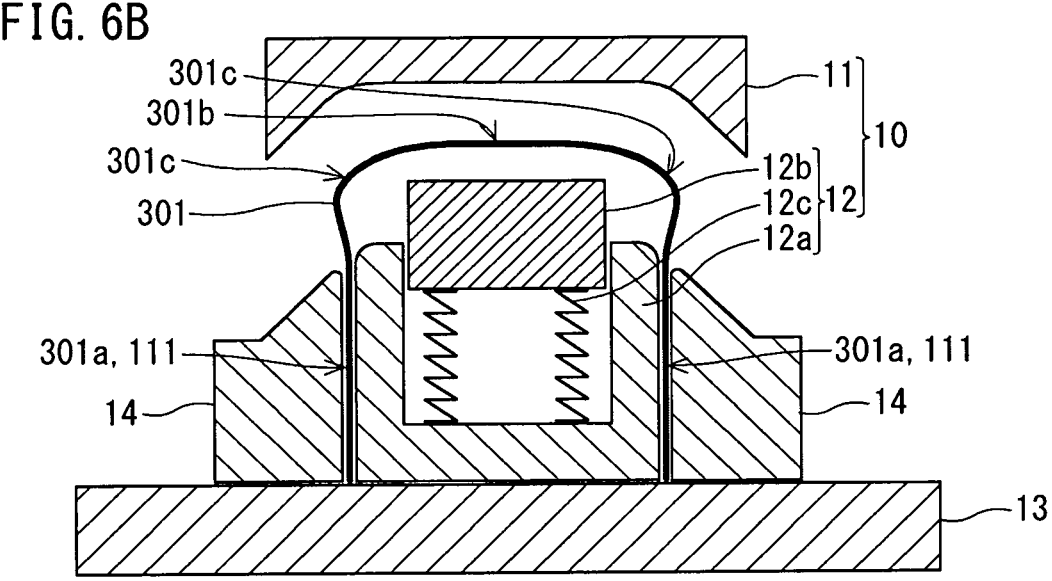
FIG. 6B is a cross-sectional view schematically showing one step following the one step shown in FIG. 6A.

One example of a process of performing press forming using the device shown in FIG. 6A is described. First, as shown in FIG. 6A, the preformed product 301 is set between the upper die 11 and the lower die 12. Next, as shown in FIG. 6B, the slide dies 14 are caused to slide toward the lower die 12, thus constraining the two first portions 301a by the lower die 12 (lower die body 12a) and the slide dies 14 (step (i)). With such an operation, the first portions 301a are formed into the vertical wall portions 111. In this state, the second portion 301b and the surplus portions 301c can be freely deformed.

Figure 6C:
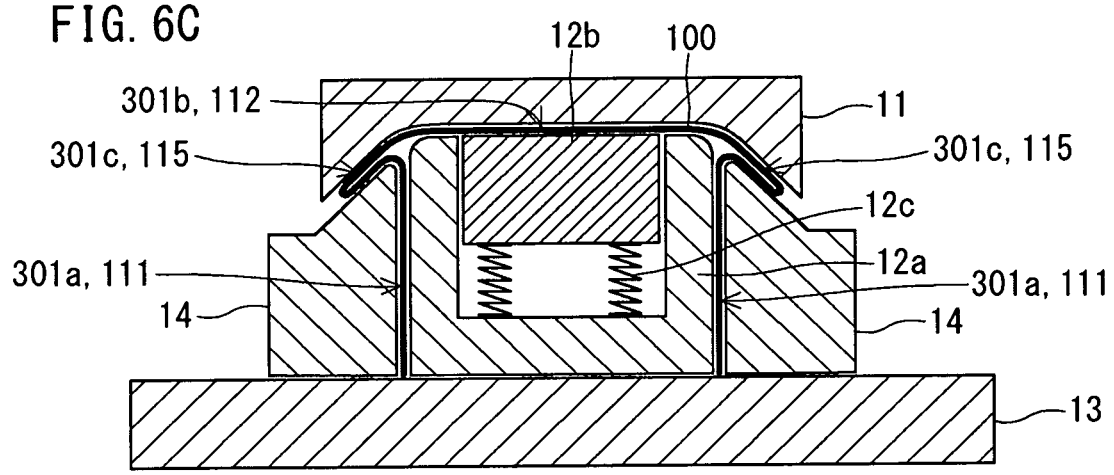
FIG. 6C is a cross-sectional view schematically showing one step following the one step shown in FIG. 6B.

Next, in a state where the first portions 301a are constrained, as shown in FIG. 6C, the upper die 11 is moved downward so as to press the second portion 301b by the lower die 12 and the upper die 11, and so as to press the surplus portions 301c by the upper die 11 and the slide dies 14. With such operations, the press formed product 100 is formed (step (ii)). At this point of operation, the second portion 301b is sandwiched between the pad 12b and the upper die 11, and is moved downward while maintaining such a state and, then, reaches the upper surface of the lower die body 12a. With such operations, the top plate portion 112 is formed. Each surplus portion 301c comes into contact with the upper die 11 and the slide die 14 with the downward movement of the upper die 11, thus being gradually bent and, then, being formed into two layers. With such operations, the projecting portions 115 are formed each of which includes an overlapping portion, and projects obliquely downward. The press formed product 100 which includes the projecting portions 115 can be acquired in this manner.

In the case of performing the second step by hot stamping, the heated preformed product 301 is cooled at the time of performing press forming so that press forming and quenching are performed.

Figure 6D:
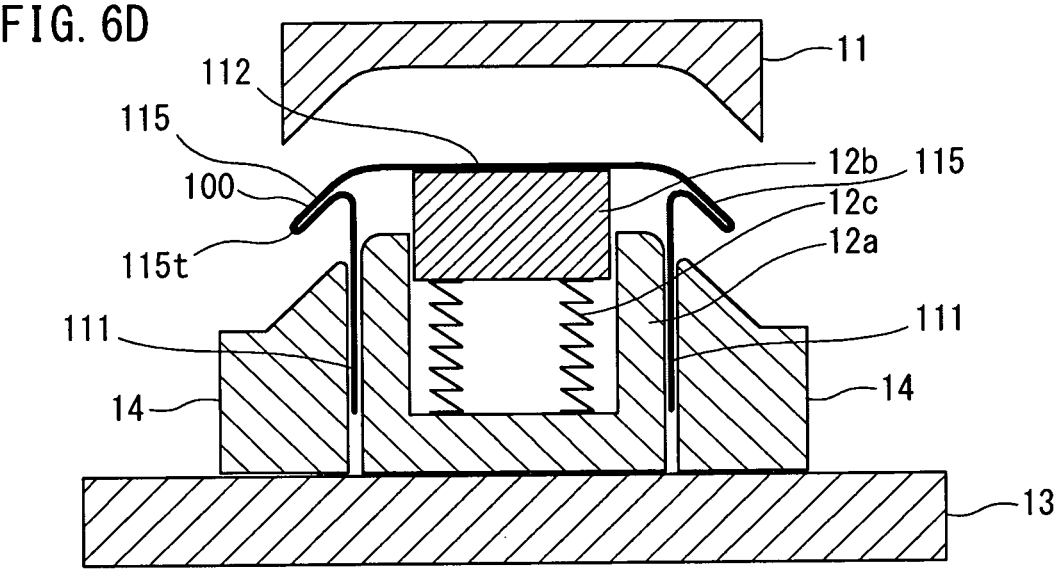
FIG. 6D is a cross-sectional view schematically showing one step following the one step shown in FIG. 6C.

Each projecting portion 115 of the press formed product 100 projects obliquely downward. Accordingly, it is preferable to move the press formed product 100 upward before the slide dies 14 are returned to an original position. Specifically, first, as shown in FIG. 6D, after the step (ii) is performed, constraint of the vertical wall portions 111 performed by the lower die 12 and the slide dies 14 is released, and the upper die 11 and the pad 12b are moved upward, thus moving the press formed product 100 upward (step (iii)). At this point of operation, the press formed product 100 is moved upward such that the lower edges of the projecting portions 115 (distal end portions 115t) are positioned above the upper edges of the slide dies 14. Constraint of the vertical wall portions 111 can be released by slightly separating the slide dies 14 from the lower die 12.

Figure 6E:
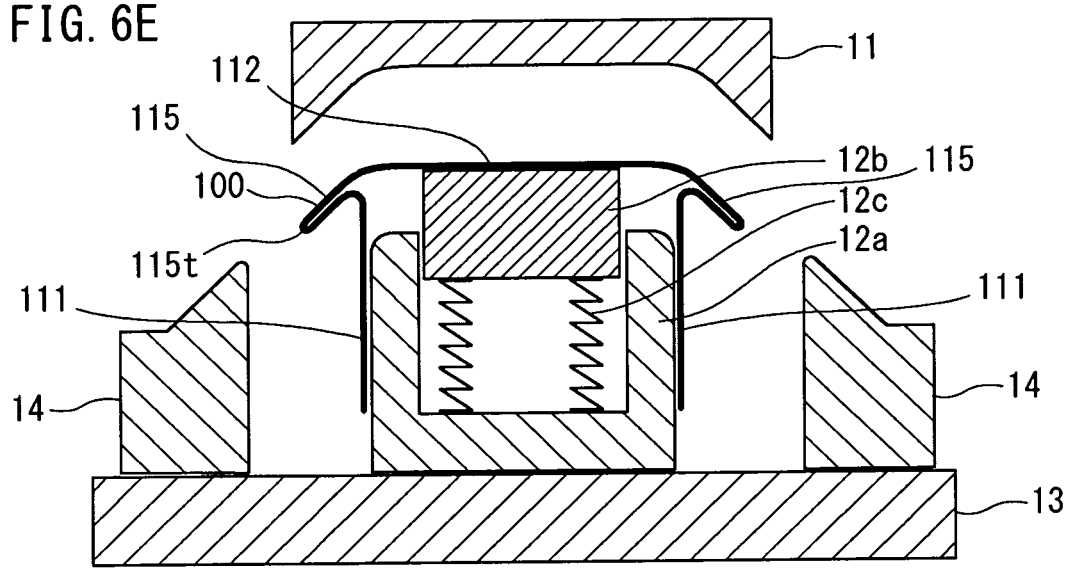
FIG. 6E is a cross-sectional view schematically showing one step following the one step shown in FIG. 6D.

Next, as shown in FIG. 6E, after the step (iii) is performed, the slide dies 14 are separated from the lower die 12 (step (iv)). For example, as shown in FIG. 6E, the slide dies 14 are caused to slide such that the slide dies 14 are positioned further outward than the distal end portions 115t of the projecting portions 115. Thereafter, the press formed product 100 is taken out from the pressing device.

In the case of forming a press formed product which includes flange portions, it is sufficient to further pressing the press formed product 100 which is acquired through the above-mentioned steps, thus forming the flange portions (third step). One example of a method for forming a flange portion is shown in FIG. 7A and FIG. 7B.

Figure 7A:
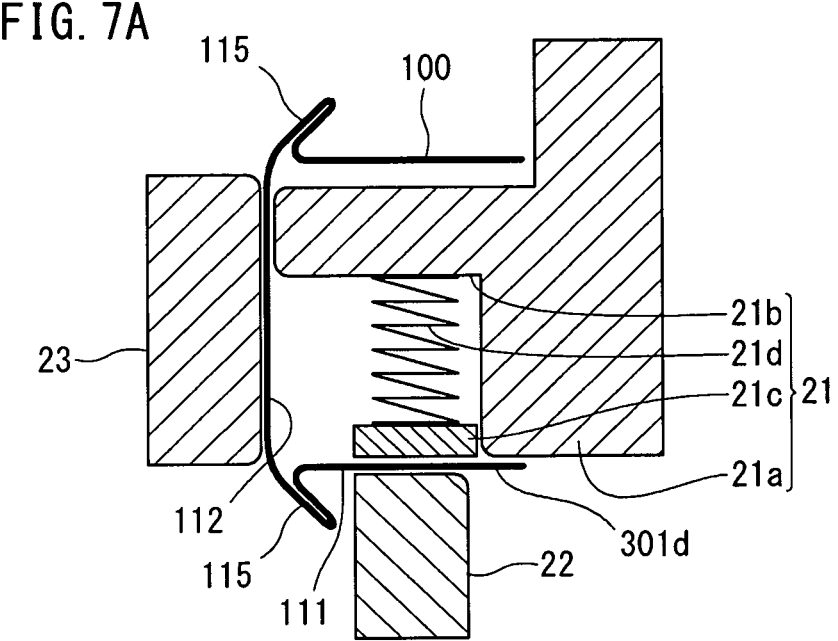
FIG. 7A is a cross-sectional view schematically showing one step in one example of a method for forming a flange portion.
Figure 7B:
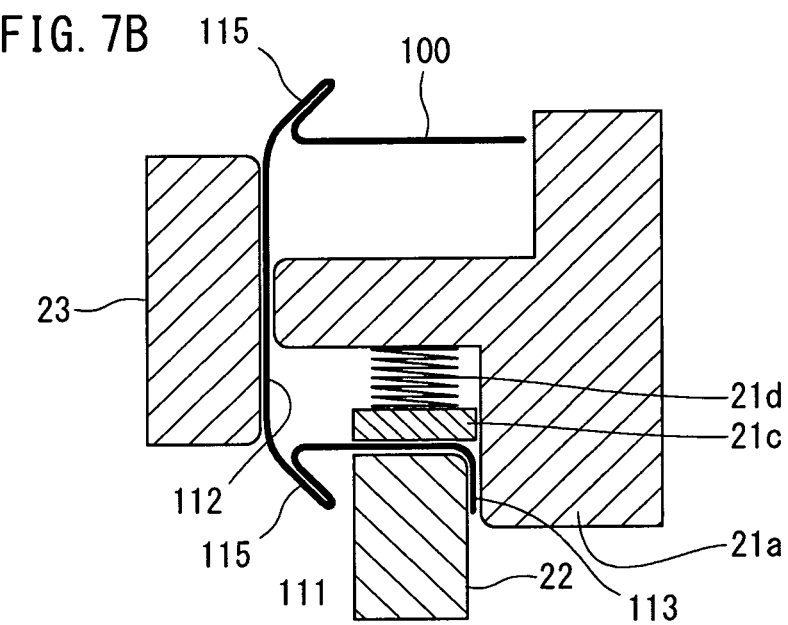
FIG. 7B is a cross-sectional view schematically showing one step following the one step shown in FIG. 7A.

A pressing device shown in FIG. 7A includes an upper die 21, a lower die 22, and a posture holding die 23. The upper die 21 includes a projecting portion 21a, a recessed portion 21b, a pad 21c, and an extension and contraction mechanism 21d. The pad 21c is connected to the recessed portion 21b by the extension and contraction mechanism 21d which can be extended and contracted.

First, as shown in FIG. 7A, the press formed product 100 is set on the pressing device. The posture holding die 23 is provided for preventing the press formed product 100 from being inclined so that the posture holding die 23 does not constrain the press formed product 100. Next, the upper die 21 is moved downward. With the downward movement of the upper die 21, first, a portion of the vertical wall portion 111 is fixed by the pad 21c and the lower die 22. When the upper die 21 is further moved downward, the extension and contraction mechanism 21d is constrained, and a third portion 301d which is contiguous from the vertical wall portion 111 is bent. One flange portion 113 is formed as described above. The other flange portion is formed in the same manner so that the press formed product (P) which includes two flange portions can be acquired.

In the case of producing the structural member (S) of this embodiment, it is sufficient to fix another member (M) to the press formed product (P) acquired through the above-mentioned steps by any desired method.

EXAMPLE

The present invention is described in more detail with reference to examples.

In the example, a simulation of a three-point bending test was performed on a structural member (S) with the press formed product (P) of this embodiment. In the simulation, a general-purpose FEM (finite element method) software (made by LIVERMORE SOFTWARE TECHNOLOGY, trade name: LS-DYNA) was used.

Figure 8A:
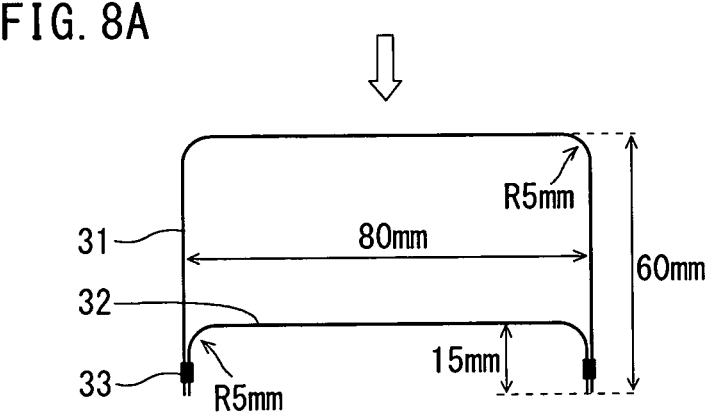
FIG. 8A is a cross-sectional view schematically showing the shape of a sample 1 (Comparative Example) used in an example.

FIG. 8A is a cross-sectional view schematically showing a sample 1 used in the simulation as a Comparative Example. The sample 1 shown in FIG. 8A is formed of two U-shaped members 31 and 32. Each of the U-shaped members 31 and 32 includes two vertical wall portions and a top plate portion which connects the two vertical wall portions. As shown in FIG. 8A, it is assumed that the U-shaped member 31 and the U-shaped member 32 are joined by spot welding at fixing portions 33 of the vertical wall portions. Sizes of respective portions of the sample 1 are shown in FIG. 8A. The length of the sample 1 in the longitudinal direction is set to 800 mm.

Figure 8B:
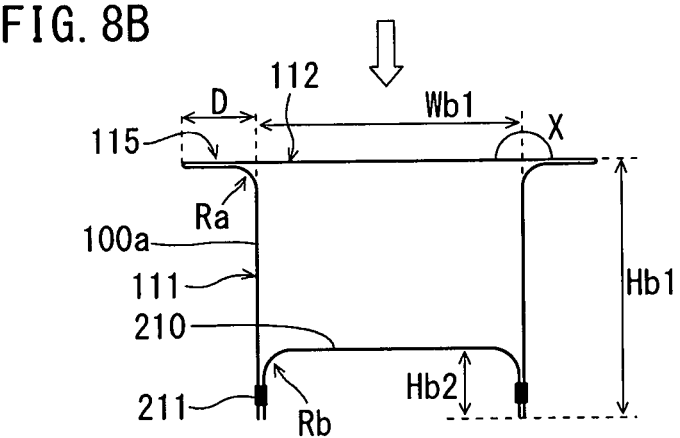
FIG. 8B is a cross-sectional view schematically showing the shape of a sample 2 (reference example 1) used in the example.
Figure 8C:
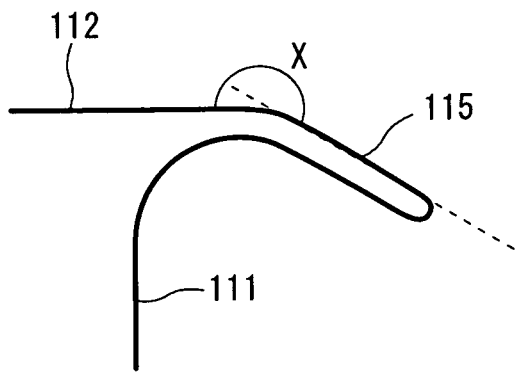
FIG. 8C is a cross-sectional view schematically showing a portion of a sample of this embodiment used in the example.
Figure 8D:
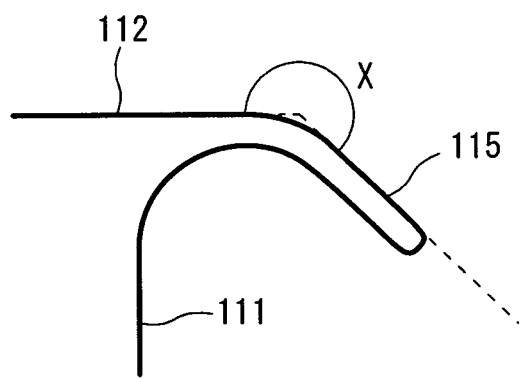
FIG. 8D is a cross-sectional view schematically showing a portion of another sample of this embodiment used in the example.
Figure 8E:
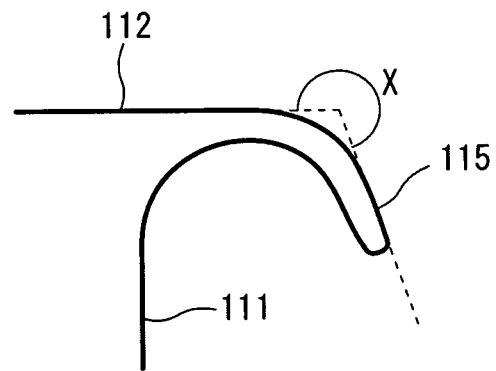
FIG. 8E is a cross-sectional view schematically showing a portion of another sample of this embodiment used in the example.
Figure 8F:
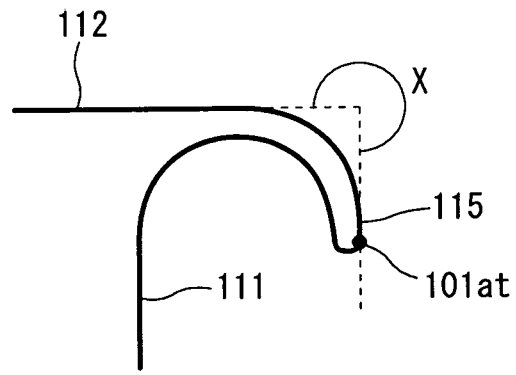
FIG. 8F is a cross-sectional view schematically showing a portion of another sample of this embodiment used in the example.

FIG. 8B is a cross-sectional view schematically showing a sample 2 used in the simulation as a reference example 1. The sample 2 shown in FIG. 8B includes a press formed product 100a and a member 210 having a U shape in cross section. In the press formed product 100a shown in FIG. 8B, the angle X is set to 180°. Accordingly, the press formed product 100a shown in FIG. 8B is different from the press formed product (P) of this embodiment. The press formed product 100a includes projecting portions 115. It is assumed that the press formed product 100a and the member 210 are joined by spot welding at fixing portions 211 of vertical wall portions 111. The shape of the sample 2 is as follows.

Angle X: 180°
Angle Y (see FIG. 2): 90°
Height Hb1 of vertical wall portion: 60 mm
Length D of projecting portion: 15 mm
Distance between two vertical wall portions (width of top plate portion) Wb1: 50 mm
Height Hb2 of member 210: 15 mm
Radius of curvature at corner portions Ra and Rb: 5 mm
Length in longitudinal direction: 800 mm Samples of this embodiment used in the simulation are obtained by changing the angle X of the projecting portion 115 of the sample 2 of the reference example 1 shown in FIG. 8B to 202°, 225°, 247°, and 270°. FIG. 8C, FIG. 8D, FIG. 8E, and FIG. 8F are cross-sectional views respectively showing projecting portions of the samples having the angle X of 202°, 225°, 247°, and 270°, and areas around the projecting portions.

Figure 8G:
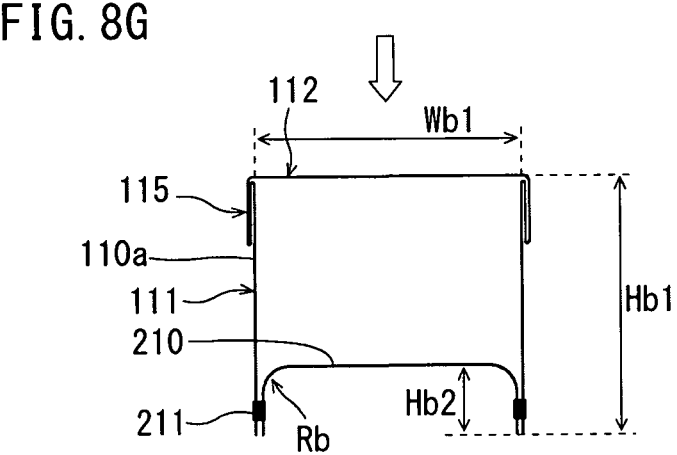
FIG. 8G is a cross-sectional view schematically showing the shape of a sample 3 (reference example 2) used in the example.

FIG. 8G is a cross-sectional view schematically showing a sample 3 used in the simulation as a reference example 2.

In the sample 3 shown in FIG. 8G, a steel sheet is folded over into three layers at an upper edge portion of each vertical wall portion 111 so that portions which correspond to the projecting portions 115 are brought into close contact with the vertical wall portions 111. That is, portions which correspond to the projecting portions 115 do not substantially project from boundary portions each of which connects the vertical wall portion 111 and the top plate portion 112 with each other. The shape of the sample 3 other than the above-mentioned portions is equal to the shape of the sample 2.

It is assumed that each of all samples is formed of a steel sheet having a thickness of 1.4 mm, and tensile strength of 1500 MPa. It is assumed that the press formed product and another member are fixed by spot welding at pitches of 40 mm.

Figure 9:
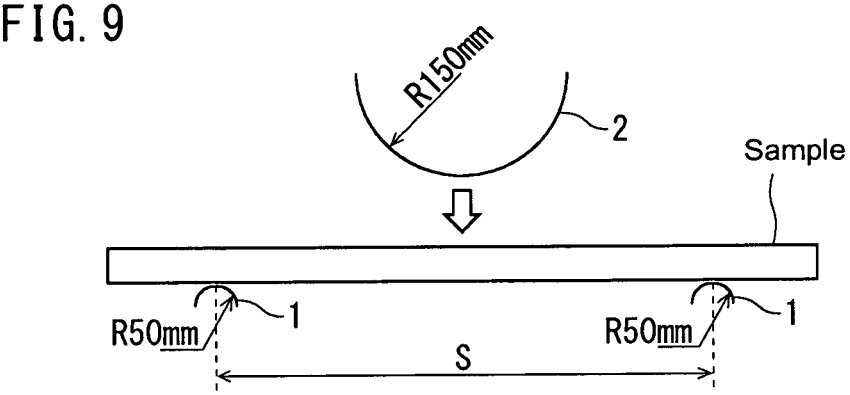
FIG. 9 is a view schematically showing a three-point bending test which is simulated in the example.

A method of the three-point bending test used in the simulation is schematically shown in FIG. 9. The three-point bending test was performed such that a sample is placed on two fulcrums 1, and the sample is pressed from above by an impactor 2. A distance S between the two fulcrums 1 was set to 400 mm or 700 mm. The radius of curvature of the fulcrum 1 was set to 50 mm. The radius of curvature of the impactor 2 was set to 150 mm. The collision speed of the impactor 2 was set to 7.2 km/h. The simulation was performed by taking into account spot welding and breaking off of material.

In the three-point bending test, the impactor 2 was caused to collide with each sample from above (from the top plate portion side). The collision direction of the impactor 2 is indicated by an arrow in FIG. 8A and FIG. 8B.

Figure 10:
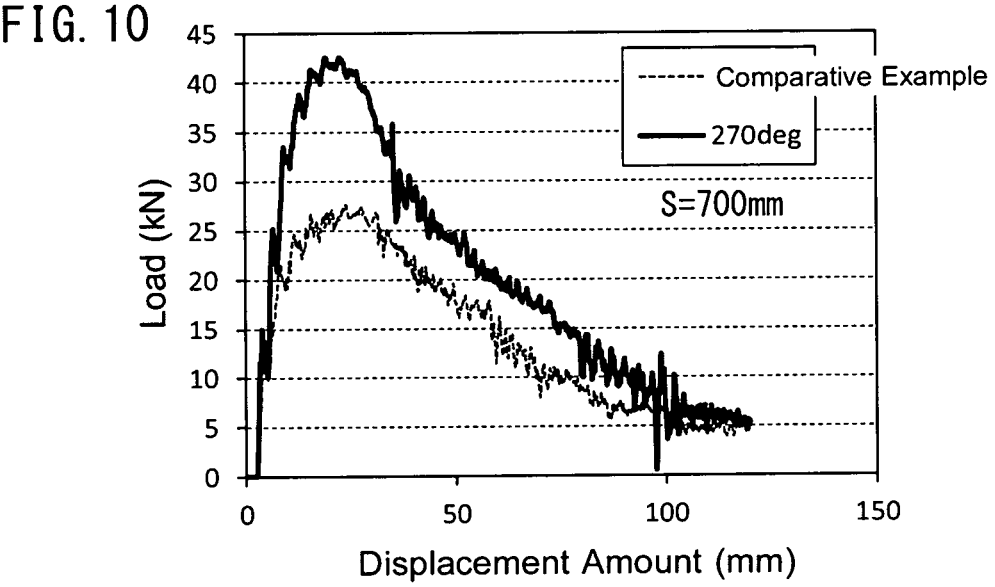
FIG. 10 is a graph showing one example of the relationship between a displacement amount and a load acquired by performing the simulation in the example.
Figure 11:
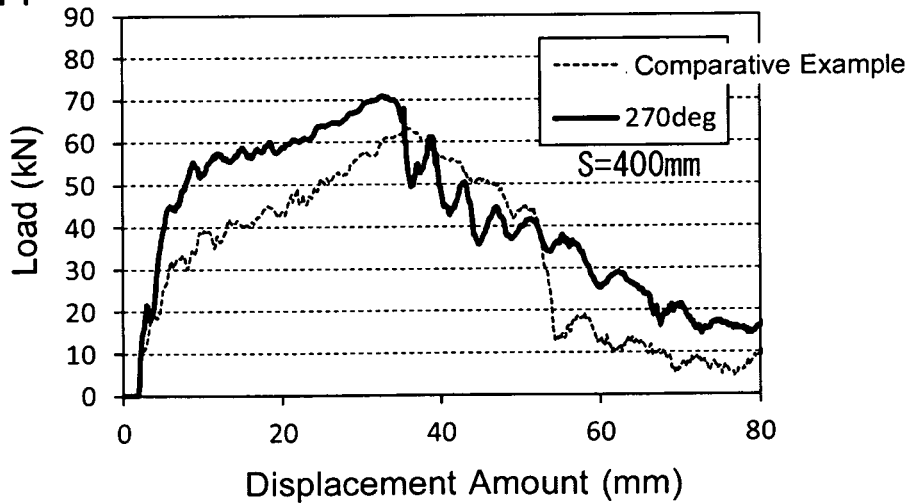
FIG. 11 is a graph showing another example of the relationship between a displacement amount and a load acquired by performing the simulation in the example.

The simulation results of the three-point bending test are shown in FIG. 10 to FIG. 13. FIG. 10 and FIG. 11 show the simulation results of the sample of the Comparative Example (sample 1) and the sample of an Inventive Example of the present invention (angle X=270°). FIG. 10 shows the results of the case where the distance S is set to 700 mm. FIG. 11 shows the results of the case where the distance S is set to 400 mm. The abscissa in FIG. 10 and FIG. 11 shows the amount of movement (amount of displacement) of the impactor 2 after the impactor 2 collides with the sample. The ordinate in FIG. 10 and FIG. 11 shows a load generated in the impactor 2.

Figure 12:
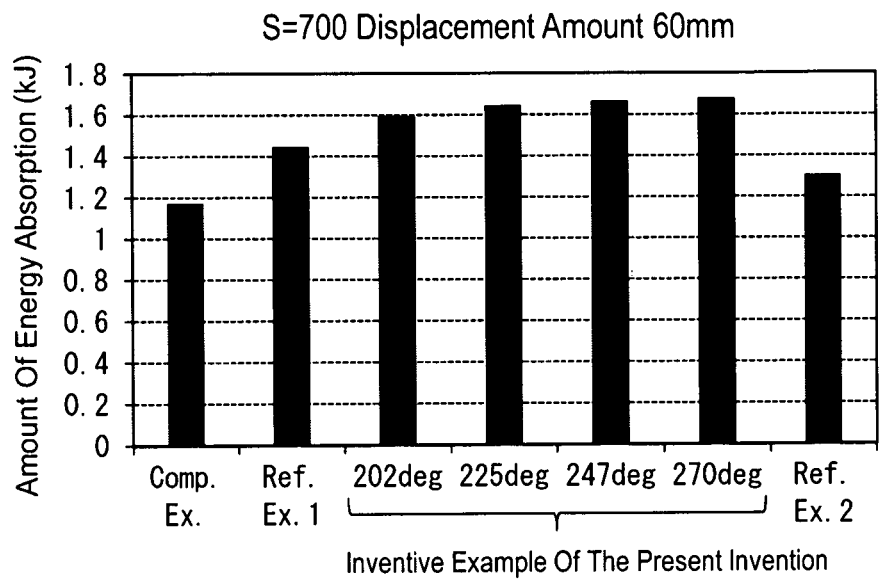
FIG. 12 is a graph showing the amount of energy absorption of each sample acquired by performing the simulation in the example.
Figure 13:
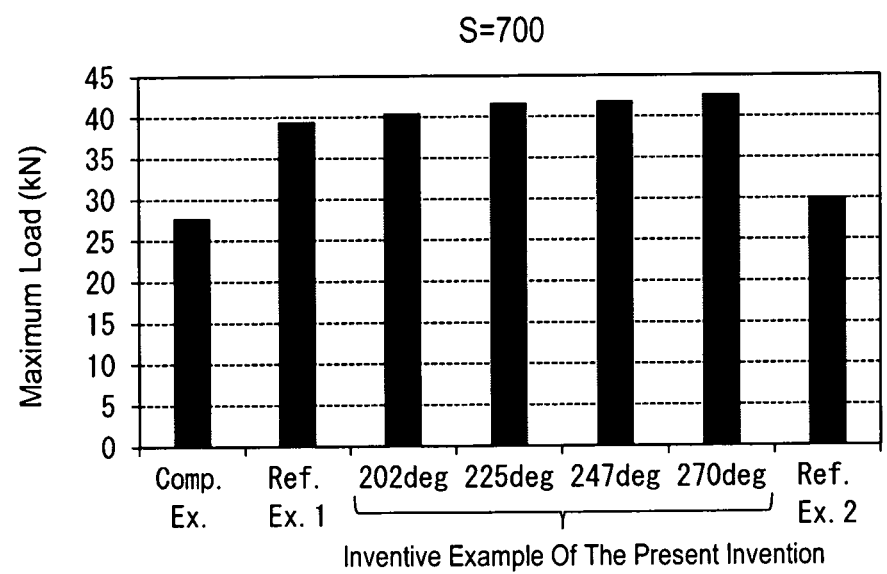
FIG. 13 is a graph showing the maximum load of each sample acquired by performing the simulation in the example.

FIG. 12 and FIG. 13 show the simulation results of the Comparative Example (sample 1), the reference example 1 (sample 2), the Inventive Examples of the present invention (angle X=202°, 225°, 247°, and 270°), and the reference example 2 (sample 3). The ordinate in FIG. 12 shows the amount of energy absorption until the displacement amount reaches 60 mm. FIG. 13 shows a maximum load generated in the impactor 2. Both of FIG. 12 and FIG. 13 show the results of the case where the distance S is set to 700 mm.

As shown in FIG. 12 and FIG. 13, in the case where the distance S is set to 700 mm, the sample of the Inventive Example of the present invention has higher characteristics than the Comparative Example (sample 1), the reference example 1 (sample 2), and the reference example 2 (sample 3).

Particularly, the Comparative Example (sample 1) and the reference example 2 (sample 3) have remarkably low characteristics. When the distance S was set to 700 mm, and the displacement amount was set to 30 mm, the vertical wall portions of the sample 1 (Comparative Example) were inclined outward. In the same manner, the vertical wall portions of the sample 3 (reference example 2) were also inclined outward. On the other hand, when the distance S was set to 700 mm, and a displacement amount was set to 30 mm, the vertical wall portions of the sample (angle X=270°) of the Inventive Example of the present invention were inclined inward. Although it is not clear at present, there is a possibility that high characteristics of the sample of the Inventive Example of the present invention are caused due to the vertical wall portions being inclined inward.

As shown in the above-mentioned examples, according to this embodiment, it is possible to acquire a structural member having high characteristics in the three-point bending test. With the use of the structural member of this embodiment, it is possible to improve collision safety of an automobile, and reduce the weight of an automobile.

INDUSTRIAL APPLICABILITY

The present invention can be used for a press formed product, an automobile structural member with the press formed product, and a method for producing the press formed product.

REFERENCE SIGNS LIST

10: press die
11: upper die (press die)
12: lower die (press die)
100: press formed product
101, 101a, 101b: steel sheet
111: vertical wall portion
112: top plate portion
113: flange portion
114: corner portion
115: projecting portion
115d: overlapping portion
200: structural member
210: another member
301: preformed product
301c: surplus portion
X: angle formed between top plate portion and overlapping portion

The invention claimed is:

1. A method for producing a hot stamp formed product from a single steel sheet,
wherein the hot stamp formed product comprises:
two vertical wall portions;
a top plate portion which connects the two vertical wall portions with each other;
at least one projecting portion which projects from at least one boundary portion of two boundary portions each of which connects the vertical wall portion and the top plate portion with each other, and
a portion which is bent toward the projecting portion from an upper edge side of the vertical wall portion is a corner portion, wherein
in the projecting portion, the steel sheet extending from the vertical wall portion and the steel sheet extending from the top plate portion project from the boundary portion so as to be bent and folded back to make an overlapping portion located at least at a distal end of the projecting portion, so that the steel sheet extending from the vertical wall portion and the steel sheet extending from the top plate portion have a part parallel with each other within a range from the corner portion to the projecting portion,
the projecting portion is present at least at a portion of the hot stamp formed product in a longitudinal direction, and an angle formed between the top plate portion and the overlapping portion is larger than 180°, the method comprising:

a first step of forming a preformed product including two first portions to be formed into the two vertical wall portions and a second portion to be formed into the top plate portion by deforming a blank steel sheet; and a second step of forming the hot stamp formed product by performing hot stamp forming on the preformed product after being heated to a quenching temperature, wherein the preformed product includes a surplus portion for forming the projecting portion, the preformed product has a substantially U shape in cross section, and in the second step, at least portions of the blank steel sheet constituting the surplus portion are made to overlap with each other, thus forming the overlapping portion.

2. The method for producing the hot stamp formed product according to claim 1, wherein tensile strength of the blank steel sheet is 590 MPa or more.

3. The method for producing the hot stamp formed product according to claim 1, wherein the second step is performed using a hot stamp die which includes a lower die, an upper die, and a slide die which is movable in a horizontal direction toward the lower die, and the second step includes: a step (i) where the two first portions are constrained by the lower die and the slide die; and a step (ii) where, in a state where the two first portions are constrained, the second portion is hot stamped by the lower die and the upper die, and the surplus portion is hot stamped by the upper die and the slide die, thus forming the hot stamp formed product.

4. The method for producing the hot stamp formed product according to claim 3, wherein the lower die includes a lower die body, and a pad which is connected to the lower die body via an extension and contraction mechanism, and the method includes: a step (iii) where, after the step (ii), constraint by the lower die and the slide die is released, and the upper die and the pad are moved upward, thus moving the hot stamp formed product upward; and a step (iv) where, after the step (iii), the slide die is separated from the lower die.

5. The method for producing the hot stamp formed product according to claim 3, wherein the hot stamp formed product includes two flange portions which extend from edge portions of the two vertical wall portions, and the method includes a third step of forming the flange portions after the second step.

* * * * *